United States Patent [19]

Mueller

[11] 4,024,784
[45] May 24, 1977

[54] ROTARY SLITTING SHEAR HAVING SEPARATELY POWERED CUTTERS

[75] Inventor: Thomas L. Mueller, St. Louis, Mo.

[73] Assignee: Engel Industries, Inc., St. Louis, Mo.

[22] Filed: Jan. 23, 1976

[21] Appl. No.: 651,639

[52] U.S. Cl. .................................. 83/488; 83/500; 83/495; 83/471.2

[51] Int. Cl.² .......................................... B26D 1/24

[58] Field of Search ................ 83/471.2, 487, 488, 83/495, 500

[56] References Cited
UNITED STATES PATENTS

| | | | |
|---|---|---|---|
| 1,727,796 | 9/1929 | Summer | 83/500 X |
| 2,946,251 | 7/1960 | Engel | 83/488 |
| 3,190,094 | 6/1965 | Kutas | 83/495 |
| 3,791,246 | 2/1974 | Lazickas | 83/495 |
| 3,949,633 | 4/1976 | Cauffiel | 83/488 |

*Primary Examiner*—Donald R. Schran

[57] ABSTRACT

In that type of sheet metal shear having upper and lower rotary cutters to which power is supplied, both to cut a sheet of metal overhanging a work table edge and to propel the shear along the line of cut, unexpected capacity is achieved. The upper and lower cutters are powered each with separate motor. The cutters are driven through bevel gear sets; the upper motor is positioned with clearance above the work table, with its shaft slanting downward to the bevel gear intersection. Using the separate upper motor eliminates the transmission of power along and across the upward slanting bridge portion of the frame aft of the cutters. With this function eliminated, the bridge portion may be lower, requiring less power to deflect the scrap being cut off. With this saving of power added to the saving from using the efficient bevel gear sets, heavier gauge sheets are slit with less power than heretofore required for thinner sheets.

2 Claims, 3 Drawing Figures

ROTARY SLITTING SHEAR HAVING SEPARATELY POWERED CUTTERS

BACKGROUND OF THE INVENTION

For slitting or shearing off scrap from a piece of sheet metal held on a work table, a type of shear having dual tractive cutters, as shown in U.S. Pat. No. 2,946,251 has come into common use. In this type of shear, upper and lower rotary cutters, whose edges are adjacent to each other in cutting relationship along a vertical plane of cut, are mounted on lateral shafts through forward parts of upper and lower frame portions, joined together by an upward slanting bridge part aft of the cutters. The upper frame portion lies inward of the line of cut and passes above the horizontal work surface on which the sheet to be cut is laid and clamped. At the intersection of the rotary cutters, the lower frame portion is entirely beneath the work surface level. Aft of the cutters its upper edge slants upward and aft, to overlap and join the aft lower part of the upper frame portion. This upward slanting joining part of the frame is referred to as its bridging portion.

In such prior art cutter, an electric motor is mounted onto the outer side of the lower frame portion. This motor provides power to both cutters; necessarily its diameter is large and it is mounted low. After its power is transmitted first to a gear on the lower cutter shaft, a sprocket on this shaft drives a chain which extends slantingly upward to a sprocket near the aft end of the sloping bridge juncture. The power is then transmitted to the inner side of the upper frame, and, its direction of rotation being reversed, is carried by a chain and sprocket to drive the upper rotary cutter. This is driven at the same speed as the lower rotary cutter but in an opposite sense.

One function of the upward sloping edge of the bridging part is to deflect the scrap being cut from the sheet slantingly upwards over the bridging part. To accommodate power transmission mechanism beneath the deflected scrap requires a fairly large overlap of the outer and inner frame parts, and hence a substantial upward slope angle. Especially when thicker sheets are to be cut, the need to deflect the scrap upwardly adds to the power requirement of the shear.

SUMMARY OF THE INVENTION

The principal purpose of the present invention is to minimize the slope of the bridge juncture part of the frame of such a self-propelled dual tractive shear, thus to minimize the energy required to deflect the scrap part of the sheet. Another purpose is to provide for supplying more power to such a shear and to minimize power losses in transmission. Still further purposes will be apparent from this specification.

Summarizing the invention generally, and without limitation of its scope, there is here provided a motor and power drive system in which the upper rotary cutter is powered, independently of the lower rotary cutter, by a motor whose shaft extends generally forward to a bevel gear drive to the upper cutter. In the preferred embodiment the upper motor is so mounted that its shaft is canted downward toward the bevel gear intersection, the motor having sufficient clearance to pass over the sheet metal on the table surface. By so canting the motor shaft, the permissible size of the motor is substantially increased. The lower motor, whose upper extremity is positioned lower than the slanting edge of the bridge juncture of the frame, similarly drives a 45° bevel gear set powering the lower cutter, and its shaft may, if necessary be canted upward to its bevel gear intersection.

The bridge juncture part is thus freed of the function of carrying power transmission mechanism. Its only remaining functions are to join the lower outer frame part to the upper inner frame part, and to deflect the scrap over the juncture. With its functions so minimized, its upward slope is likewise minimized, lessening the power required to deflect the scrap. Since bevel gear sets permit power to be supplied at any angle necessary for clearance, motors of adequate physical size may be used to drive both cutters. However, the total power of two motors so used is markedly less than the single motor of the prior machine.

Thus, by the decrease of slant of the bridging part and the corresponding lessening of power required to deflect the scrap portion upward, and by the use of 45° bevel gears to mount the motors at any angles required for clearance and minimize losses of power transmission to the cutter, efficiency of operation is greatly increased.

Slippage of the cutters as they grasp and cut simultaneously would seemingly be a more aggravated problem if the cutters were powered independently. In the present invention, the biting grasp exerted by the contra-rotating cutters onto the sheet metal being slit is supplemented by adding a rubber traction wheel, preferably outwardly adjacent to the upper cutter and of the same diameter, and whose width is slightly less than that of the lower cutter. The lower cutter's outer edge is a cylindrical surface. With the rubber wheel pressing elastically against the upper surface of the metal sheet being slit, and its pressure resisted by the cylindrical surface of the lower cutter, the sheet is grasped elastically and positive traction is exerted. This achieves uninterrupted forward movement of the slitting shear, without either motor overspeeding.

DESCRIPTION OF THE PREFERRED EMBODIMENT

Figure 1:
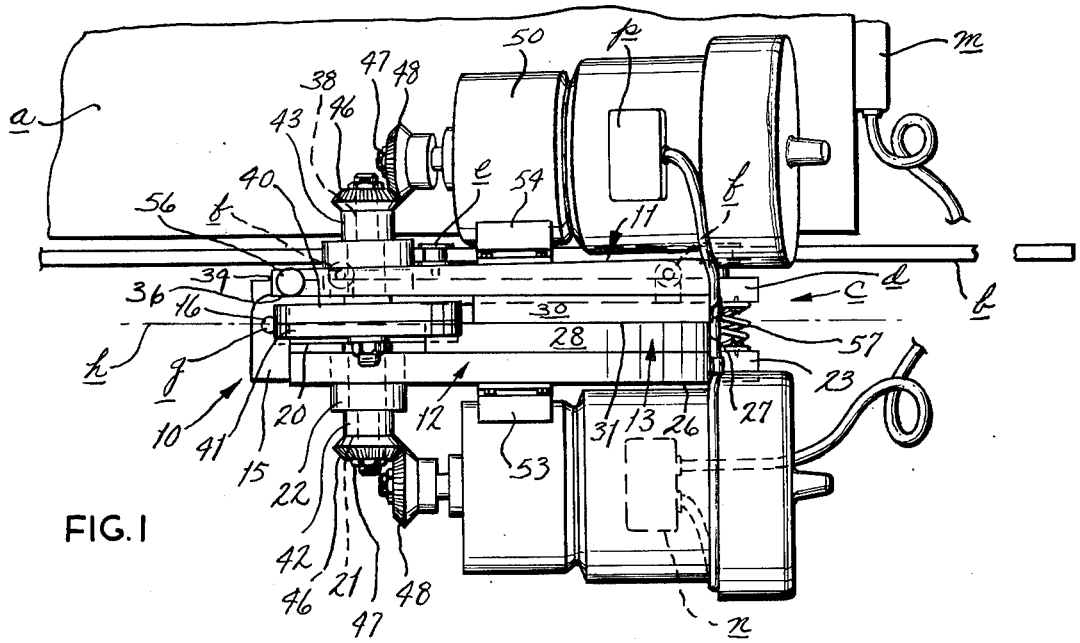
FIG. 1 is a plan view of a rotary slitting shear embodying the present invention pivotally mounted on a carriage supported by a track along the edge of a work table, shown in phantom lines.

The type of rotary slitting shear whose improvement is the subject of the present invention is utilized in connection with a work table $a$ having a track $b$ mounted outward of its edge and below its horizontal work surface. A shear carriage generally designated $c$, of the type shown in said U.S. Pat. No. 2,946,251, consists essentially of a carriage plate $d$ supported on the track $b$ by upper and lower flanged rollers $e$ bracket-mounted onto the plate $d$. Stabilizing rollers $f$, similarly bracket mounted, bear against the outer surface of the track $b$. The carriage plate $d$ has a pair of vertically aligned pivots $g$ near its forward end.

The frame generally designated 10 of the present shear consists functionally of two portions: an inner upper frame portion generally designated 11 and a lower outer frame portion generally designated 12, the latter having, aft of the cutters to be described, a bridge juncture part itself generally designated 13 securing the lower frame portion 12 to the upper frame portion 11. Near its forward end, shown to the left of FIGS. 1 and 2, the lower outer frame part 12 has a pair of aligned upper and lower pivot lugs 15 with vertical bores 16 which fit onto the pivots $g$ of the shear carriage $c$.

Figure 3:
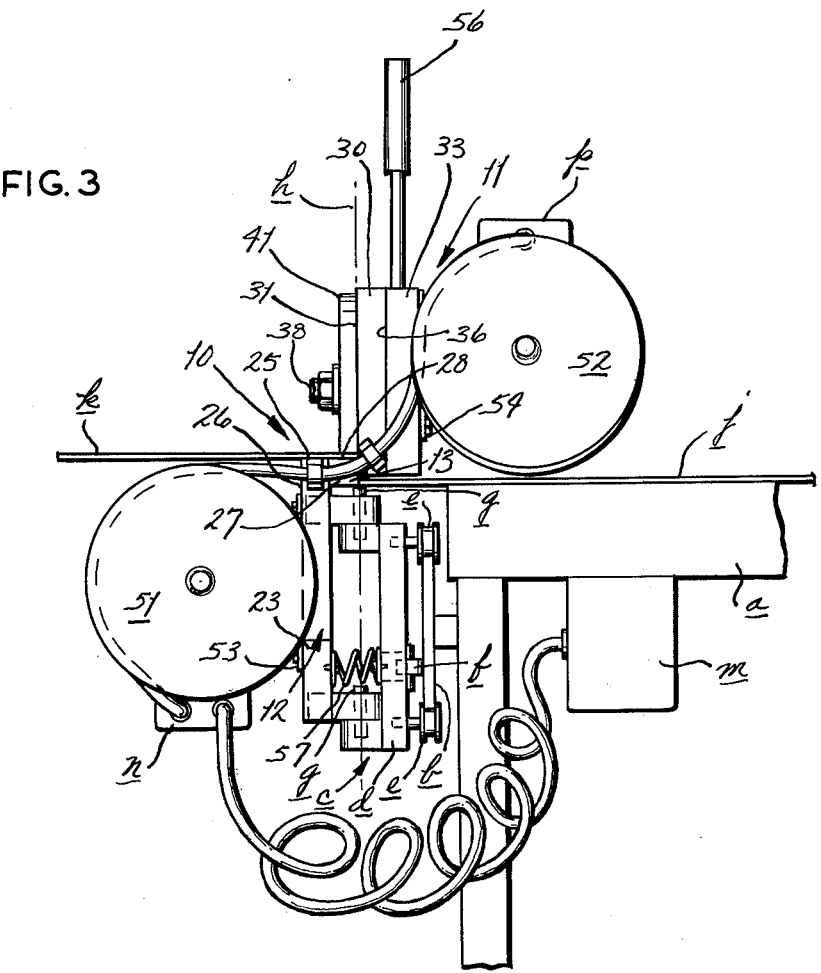
FIG. 3 is a right end view thereof.

As best seen in FIG. 3, the upper inner frame portion 11 is positioned inwardly of the line of cut to be made by the shear, while the lower frame portion 12 lies outwardly of the line of cut. This upper frame portion 11 is positioned above the work table $a$ with sufficient clearance to accommodate a sheet of metal $j$ to be cut. The forward part of the lower outer frame portion 12 lies below the level of the horizontal work surface of the table $a$ but its bridge juncture part 13 rises slantingly above that work surface, and is accommodated beneath the slit-off portion $k$ of a sheet metal work piece $j$ by its upward deflection.

The principal member of the lower frame portion 12 is an outer vertical plate 18 to whose forward end the pivot lugs 15 are secured. As seen at the left side of FIG. 2, the lugs 15 extend inwardly above and below the forward edge of a lower rotary cutter disc 20, mounted on a shaft 21 which extends through a bushing 22 the forward part of the plate 18. The bushing 22 is set in the plate 18 at such height to position the uppermost part of the cutter disc 20 for cutting sheet metal on the work table $a$. The plate 18 extends rearward (to the right in FIGS. 1 and 2) from the lugs 15 to provide an outer side area sufficient for mounting a motor, hereinafter described, which powers the lower rotary cutter disc 20. The plate 18 may have a lower aft extension portion 23 below the maximum diameter portion of such motor.

Figure 2:
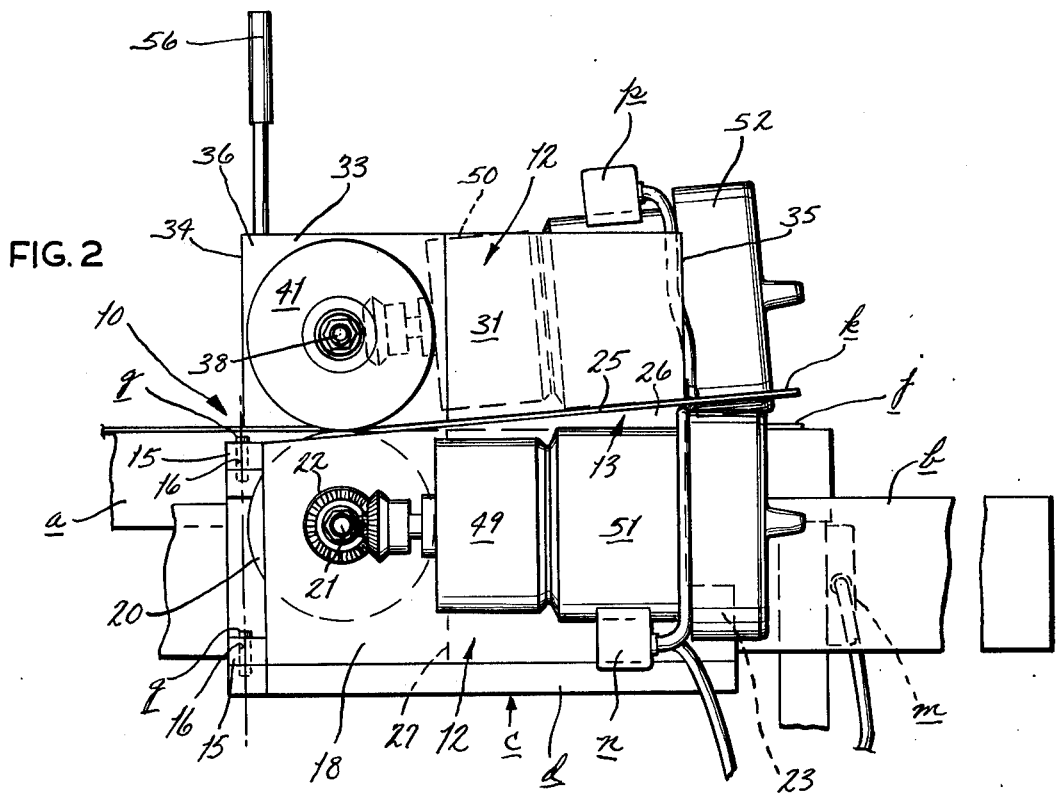
FIG. 2 is a side elevation thereof.

As seen in FIG. 2, the upper pivot lug 15 is located below the horizontal plane of the work table $a$. The plate 18 has, aft of the upper lug 15, an upward slanting upper edge 25 which aft of the cutter disc 20 extends above the horizontal plane of the work table $a$. The portion of the plate 18 above that plane is referred to as its bridge juncture part 26.

Secure to the inner surface of the plate 18 commencing aft of the cutter disc 20 is a bridge juncture insert plate 27 having a similarly slanting upper edge 28. The innermost surface of the insert plate 27 coincides substantailly with the vertical plane $h$ along which the sheet metal is to be slit, that is, substantially with the inner surface of the lower rotary cutter 20.

The bridge juncture part 13 of the lower frame portion 12 is made up of the slanting upper rear portion of the plate 18 and the insert plate 27 welded together and, above the plane of the work table surface $a$, welded to the inner upper frame portion 11. As illustrated in FIGS. 1 and 3, the outermost member of the upper frame portion 11 is an upper insert plate 30 whose forward edge is immediately aft of the upper rotary cutter, to be described, and whose outer vertical surface 31 lies immediately inward of and adjacent to the vertical plane of cut $h$. Its lower aft corner is overlapped by the upper aft part of the lower insert plate 27 and welded to it to form the wedge-like bridge juncture 13. The outer vertical surface 31 of the upper insert plate 30 abuts the cutoff scrap portion $k$ of the slit metal as it is turned upward by the forward progress of the wedge-like juncture 13.

Mounted by secure attachment means, such as welding, to the inner surface of the upper insert plate 30 is a main upper frame plate 33. In the embodiment shown the plate 33 tapers from a narrower forward edge 34 to a rear edge 35, to provide on its inward side a planar vertical surface 36 which is not parallel to the vertical plane of cut $h$, but, as seen in the plan view FIG. 1, is set at a conventional toe-in angle of several degrees inwardly and aft. The plate 33 is bored perpendicular to this surface 36 to accommodate an upper cutter shaft 38 on which an upper rotary cutter 40 is mounted toed in relative to the lower rotary cutter disc 20. The upper rotary cutter disc 40 is of the same diameter of the lower rotary cutter disc 20 and, as in prior practice, is held in cutting relationship with it at the level of a sheet of metal $j$ positioned on the work table surface $a$. On the outer side of the upper cutter disc 40 there is mounted an elastic rubber disc 41 of the same diameter and somewhat lesser width. Its peripheral edge overlaps a major portion of the lower cutter 20.

Spacer bushings 42, 43 are provided on the lower and upper cutter shafts 21, 38 opposite to the cutter discs 20, 40. 45° bevel gears 46, held by nuts 47, are mounted on to the ends of these shafts, to be driven by similar bevel gears 48 mounted on the shafts of gear reducers 49, 50 of lower and upper electric motors 51, 52 respectively. Conveniently the motors 51, 52 are mounted by simple lower and upper brackets 53, 54 by which the housings of the gear reducers 49, 50 are bolted to the lower outer frame plate 18 and the upper frame plate 33 respectively.

Since the expected method of mounting motors would be with their shafts horizontal, it would seem at first glance to be impossible to construct a slitter with separate motors of larger diameter than the cutter discs. However, as seen in FIG. 3, the slit off portion $k$ of the metal sheet $j$ will be cammed upward by forward travel of the bridge juncture part 13.

As to the upper inner motor 52, the problem of accommodating a motor larger in diameter than the cutter is solved by positioning it so that its shaft is canted downward toward the point of meshing of the bevel gears 46, 48 on the upper cutter shaft 38. Its mounting bracket 54 is therefore set to elevate the lowermost part of the motor 52, as shown in FIG. 3, to pass over the sheet metal $j$ on the work table $a$.

Because the present invention reduces the size of motors required, the lower motor 51 may, as seen in FIGS. 2 and 3, be mounted with its shaft horizontal, taking advantage of the increase in height afforded by the upward slant of the edge 25. If larger motors were required, lower motor 21 would be set at an angle so that its shaft was canted upward toward the point of meshing of the bevel gears which it drives.

A simple handle 56 projecting upwardly from the forward end of the main upper frame plate 33 is used, at the start of a cut, to draw the machine on its carriage $c$ so that the upper and lower cutters 40, 20 engage the sheet metal. Thereafter they propel themselves through it with the frame 10 pivoting slightly about the pivot $g$ from time to time to accommodate variations in grain structure. Such pivoting is controlled by a spring 57 secured, as seen in FIGS. 1 and 3, between the aft extension 23 of the outer frame plate 18 and the carriage plate $d$.

Smoothness of propulsion and constancy of its speed is achieved by the tractive grasp of the rubber disc 41 which overlies the lower cutter disc 20; together they draw the shear forward by grasping the sheet metal part $j$ just outward of the line of cut.

Electricity is supplied to the two motors 51, 52 from a power source not shown through a switch $m$ mounted on the work table *a*, and through coiled electric wiring to a first junction box *n* on a lower motor 51 and a second junction box *p* on the upper motor 52. As seen in FIG. 3, the connection to the upper junction box *p* is carried across the aft side of the bridge juncture part 13.

With constant propulsion assured by the rubber disc 41, the geared-down cutters 20, 40 require relatively small amounts of power even for cutting relatively heavy gauge sheet metal. A major factor in reducing the power requirement is the shallow slope of the upper edges 25, 28 of the bridge juncture part 13. Using a tractive shear of the prior design, a substantial amount of power was required to cam the slit off portion of sheet metal *k* upward along the relatively high angle of its bridge part which carried mechanism for transmitting power to the upper cutter. In the present design the height of the bridge juncture part 13 is determined principally by the requirement of strength. Its slope may be as little as say 5°; even using thick sheet metal the slit off portion *k* may be cammed upward at this small angle with relatively little power. Two 1/6 horsepower motors 51, 52, transmitting their power efficiently to the cutters 20, 40 through the bevel gear sets 46, 48, shear heavy gauge sheet metal with greater success than a single one-horsepower motor of the prior construction.

This improved performance is due in part to lessened loss of power in transmission.

In the prior machine, power was transmitted through a worm gear drive as well as chains and sprockets and a reversing gear, with a substantial percentage of power loss. The present invention uses two separate bevel gear drives not merely for their efficiency and for the efficiency of the lower bridge juncture, but also to permit canting of the motor shafts and thus afford clearance for motors 51, 52 whose maximum diameter is greater than that of the cutter discs 20, 40. One would not expect that there could be substantially direct drive of rotary cutter discs by motors of greater diameter.

From this disclosure, adaptations and modifications of the concepts disclosed will be apparent to persons skilled in the design, construction, and operation of such machinery.

I claim:

1. In that type of sheet metal shear which propels itself along a track adjacent to an edge of a horizontal work surface, the shear having an upper rotary cutter and a lower rotary cutter whose edges are adjacent to each other in cutting relationship along a vertical plane of cut, the upper rotary cutter being mounted at the inner end of an upper lateral shaft through the forward part of an upper frame portion lying inward of the line of cut and above the plane of such horizontal work surface, the lower cutter being mounted at the inner end of a lower lateral shaft through the forward part of a lower frame portion lying outward of such vertical plane of cut, its forward frame part being beneath the plane of such horizontal work surface, the lower frame portion having a bridge juncture part whose upper edge slants upward and aft to overlap and join the aft lower part of the upper frame portion, there being a lower motor mounted to said lower frame portion and a power drive therefrom to the lower cutter, the improvement comprising a bevel gear on the inner end of said upper shaft, and an upper motor mounted on the inner side of the upper frame portion with clearance above such horizontal plane and having a motor shaft extending generally forward and downward to a bevel gear mounted thereon in mesh with said bevel gear on the upper cutter shaft, whereby to position such upper motor with clearance above such horizontal table surface, though such motor may be as large as or larger in diameter than the diameter of said upper cutter.

2. The improved self-propelled shear defined in claim 1, in which the power drive from the lower motor includes a bevel gear on the outer end of said lower cutter shaft, the shaft of the lower motor extending generally forwardly to and mounting a bevel gear in mesh with said bevel gear on the lower cutter shaft, the angle of the shaft of said lower motor being such as to position said motor entirely below the slanting upper edge of said bridge juncture part.

* * * * *